US009204485B2

(12) United States Patent
Finkenzeller et al.

(10) Patent No.: US 9,204,485 B2
(45) Date of Patent: Dec. 1, 2015

(54) NETWORK NODE FOR A WIRELESS SENSOR NETWORK

(75) Inventors: Klaus Finkenzeller, Unterfohring (DE); Katharina Schulz, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 179 days.

(21) Appl. No.: 13/695,981

(22) PCT Filed: May 3, 2011

(86) PCT No.: PCT/EP2011/002198
§ 371 (c)(1),
(2), (4) Date: Nov. 2, 2012

(87) PCT Pub. No.: WO2011/138008
PCT Pub. Date: Nov. 10, 2011

(65) Prior Publication Data
US 2013/0122813 A1 May 16, 2013

(30) Foreign Application Priority Data
May 4, 2010 (DE) .......................... 10 2010 019 193

(51) Int. Cl.
*G06K 7/00* (2006.01)
*G06K 7/10* (2006.01)
*H04W 84/18* (2009.01)

(52) U.S. Cl.
CPC ............. *H04W 84/18* (2013.01); *G06K 7/0008* (2013.01); *G06K 7/10128* (2013.01); *G06K 7/10475* (2013.01)

(58) Field of Classification Search
CPC .......... G06K 7/10128; G06K 7/10475; H04W 84/18
USPC ....................................................... 455/41.2
See application file for complete search history.

(56) References Cited

U.S. PATENT DOCUMENTS

| 2002/0130817 | A1* | 9/2002 | Forster et al. ................. 343/770 |
| 2003/0104848 | A1* | 6/2003 | Brideglall ..................... 455/574 |
| 2007/0159331 | A1 | 7/2007 | Zegelin |
| 2007/0236336 | A1* | 10/2007 | Borcherding ............. 340/10.34 |
| 2008/0111661 | A1 | 5/2008 | Lin et al. |

FOREIGN PATENT DOCUMENTS

| EP | 1 988 487 A1 | 11/2008 |
| EP | 1 820 139 B1 | 9/2009 |
| WO | 2004/004196 A1 | 1/2004 |
| WO | 2008/065337 A1 | 6/2008 |

OTHER PUBLICATIONS

Carbunar et al. "Efficient tag detection in RFID systems" J. Parallel Distrib. Comput. 69, pp. 180-196 (2009).
International Search Report for PCT/EP2011/002198, mailed Aug. 10, 2011 (8 pages).
IPRP and Written Opinion for PCT/EP2011/002198, Nov. 6, 2012.

* cited by examiner

*Primary Examiner* — Bobbak Safaipour
*Assistant Examiner* — Devan Sandiford
(74) *Attorney, Agent, or Firm* — Workman Nydegger

(57) ABSTRACT

A network node for a wireless communication network, in particular for a wireless sensor network, includes a wireless communication device operable in a first communication mode in which the communication device emits; with a first transmit power, first communication signals for contactless communication with other network nodes in the communication network. The communication device is further operable in a second communication mode, in which the communication device emits, with a second transmit power, second communication signals for communication with a transponder, whereby the second transmit power is greater than the first transmit power. In the first communication mode, by the communication device there is detectable the presence of a transponder in the environment of the network node by the first communication signals.

8 Claims, 2 Drawing Sheets

NETWORK NODE FOR A WIRELESS SENSOR NETWORK

BACKGROUND OF THE INVENTION

A. Field of the Invention

The invention relates to a network node for a wireless communication network, in particular for a wireless sensor network, which can communicate via a communication device with other network nodes in the sensor network.

B. Related Art

The network nodes employed in wireless communication networks and in particular in wireless sensor networks include corresponding communication devices for the wireless communication with other network nodes. Since network nodes in wireless communication networks often are operated self-sufficient by an energy storage device in the form of a battery or an accumulator, the transmit powers of the communication devices normally are low. The network nodes thus do not permit an RFID communication with a corresponding transponder, upon which normally higher transmit powers are employed in order to provide the transponder via contactlessly transmitted communication signals also with energy.

In the context of a near-field communication between an RFID communication device and a transponder, it is known from the print EP 1 820 139 B1 that the communication device is both operable in a communication mode and also in a detection mode. Within the communication mode the conventional RFID communication is effected via contactlessly transmitted communication signals, whereas in the detection mode detection signals are emitted with a lower transmit power than the communication signals in the communication mode. Here, in the communication device there is provided a receiving device for receiving detection signals reflected on a transponder, which receiving device evaluates the reflected detection signals and so detects the presence of the transponder in a defined area around the communication device.

From the print EP 1 988 487 A1 it is known to operate an IC card reading device in an energy-saving recognition mode, until a contactless IC card approaches the reading device, so as to then change it into a communication mode for communication with the IC card. Here, the presence of the IC card is detected via the monitoring of the energy consumption of the oscillator employed in the reading device, whereby an IC card in the environment of the reading device leads to a drop in the oscillator current.

From US 20080111661 A1 there is known an energy-saving method for establishing a communication between a reading device and a plurality of RFID tags located in the reading field thereof. The RFID tags, in principle, respond to an interrogation signal emitted by the reading device in certain time slots with tag identification information. In order to decrease the energy consumption for the interrogation procedure, the reading device increases the transmission energy, and thus the range, of the interrogation signal in several steps, starting with the lowest energy. The reading device determines the energy value to be chosen in particular according to an estimation of the number of RFID tags present.

In US 20070159331 A1 there is described a method for communication with objects which are equipped with an RFID unit. The RFID unit is operable in a first operating mode as a passive transponder and in a second operating mode as an active transmitting/receiver unit. For the second operating mode, the RFID unit has its own local energy supply, e.g. in the form of a battery. In principle, the RFID unit is operated in the first operating mode. Only when certain events occur, the operating mode is changed over to the second operating mode, in order to conserve the energy reserve.

From WO 2004/004196 A1 there is known a transmitting/receiving unit which in a first operating mode is operable as a Bluetooth device and in a second operating mode as an RFID unit.

From the publication "Efficient tag detection in RFID systems" by B. Garbunar et al, in "Journal of Parallel and Distributed Computing" No. 69, p. 180 to 196, 2009, there is known a proposal as to how there can be unequivocally and efficiently effected the recognition of transponders present in a field of an RFID reading device.

From WO 2008/065337 A1 there is known an RFID transponder, which has a control unit which switches the RFID transponder to an energy-saving mode when the RFID transponder is not located in the reading field of a transmitting/receiving unit.

SUMMARY OF THE INVENTION

It is the object of the invention to make possible an energy-efficient communication of a network node in a wireless communication network both with other network nodes of the communication network and with a transponder in the environment of the network node.

The network node according to the invention, which preferably is a sensor network node for a wireless sensor network, comprises a communication device which is operable in a first communication mode and in a second communication mode. In the first communication mode the communication device emits, with a first transmit power, first communication signals for contactless communication with other network nodes in the communication network. The first communication mode thus corresponds to the conventional operating mode of a network node in a wireless communication network. The first transmit power here is lower than a transmit power conventionally employed for an RFID communication. In particular, the first transmit power is between 0.001 and 0.1 watt.

The communication device, moreover, is operable in a second communication mode in which the communication device emits second communication signals for communication with a transponder with a second transmit power which is higher than the first transmit power and makes possible an RFID communication. Preferably, the second transmit power is between 0.5 and 4 watt. The communication device of the network node according to the invention here is characterized in that it makes possible the detection of the presence of a transponder by means of the first communication signals in the first communication mode. The first communication signals thus not only assume the task of a communication transmission between network nodes in the communication network, but they are also used as corresponding detection signals for detecting the presence of a transponder in the environment of the network node.

In a particularly preferred embodiment, the detection of the presence of the transponder is effected based on the method of the print EP 1 820 139 B1. The entire disclosure of this publication is therefore incorporated into the present application by reference. In the method described therein, for detecting the presence of a transponder there is employed a receiving device for receiving detection signals reflected on a transponder, whereby the receiving device can evaluate the reflected detection signals, in order to detect the presence of a transponder in a defined area. These detection signals now, according to the present invention, are represented by the first communication signals in the first communication mode.

In a variant of the method according to the invention the receiving device also assumes, besides the detection of the presence of a transponder, the evaluation of the first communication signals emitted by other network nodes in the first communication mode, in order to extract the information of the other network nodes contained in the first communication signals. Optionally, there is also the possibility that for this evaluation one or several separate receiving devices are employed.

In a further embodiment the receiving device employed for detecting the presence of the transponder also evaluates the second communication signals reflected from a transponder in the second communication mode, in order to extract the information transmitted by the transponder in the second communication signals. Optionally, there is also the possibility that one or several further receiving devices are employed for receiving and for evaluating the second communication signals.

In order to make it possible in a simple way for the first communication signals to be used as detection signals, in a preferred embodiment the first communication signals are modulated with a modulation method by the communication device. Via this modulation there can be ascertained in particular whether the first communication signal is a communication signal reflected from a transponder or a communication signal coming from a different network node. As a modulation preferably a frequency and/or phase modulation is used here, in which the amplitude of the signal is constant and thus the detection of a transponder based on the signal strength of the reflected first communication signal is made possible.

In a further configuration of the network node according to the invention, the communication device is configured such that a change is effected from the first to the second transmit power, when the presence of a transponder is detected. This means that a transition is thereby effected from the first to the second communication mode. In the second communication mode, the communication device then acts as an RFID reading device for the detected transponder. The transition from the first to the second communication mode here is preferably only temporary. In particular, after a change from the first to the second transmit power due to the detection of the presence of a transponder, again a change is effected to the first transmit power, when a predetermined time period has expired and/or a communication with the transponder in the second communication mode is completed and/or the transponder is no longer in the range of the communication device.

In a further configuration of the method according to the invention, a particularly energy-saving operation within the first communication mode is made possible. In particular, the first transmit power for the first communication mode here is lower by at least one power of ten than the second transmit power, whereby the first transmit power preferably is between 0.001 and 0.1 watt and the second transmit power is preferably 1 watt or more, and in particular approximately 2 watt.

The first and/or second communication signals generated via the communication device can have frequencies in the UHF frequency range or in the microwave range.

As already mentioned, the communication in the first communication mode takes place in a manner as energy-saving as possible. This can also be achieved by the first communication signals being emitted in the first communication mode without a power transmission coupled therewith, which makes possible a very low transmit power. On the other hand, the second communication signals also make possible an energy supply of the transponder.

Besides the above-described network node, the invention further comprises a wireless communication network, in particular a sensor network, with a plurality of network nodes which can wirelessly communicate with each other, whereby the communication network comprises one or several of the network nodes according to the invention, in particular exclusively such network nodes.

The invention furthermore relates to a method for detecting the presence of a transponder in an environment of a network node in a wireless communication network, in particular in a wireless sensor network. In this method, a communication device of the network node emits first communication signals for contactless communication with other network nodes with a transmit power which is lower than the transmit power required for communication with a transponder. Here, the presence of a transponder in the environment of the network node is detected by means of the first communication signals. The detection here again can be configured analogous to the method described in the above-mentioned print EP 1 820 139 B1. Moreover, the method is preferably used in the above-described network node, which makes possible an operation in a first and a second communication mode, whereby in the first communication mode the first communication signals are emitted and in the second communication mode a communication with a detected transponder is carried out with an increased transmit power based on second communication signals.

DESCRIPTION OF THE DRAWINGS

Embodiments of the invention are described in detail in the following with reference to the enclosed Figures.

DETAILED DESCRIPTION

Figure 1:
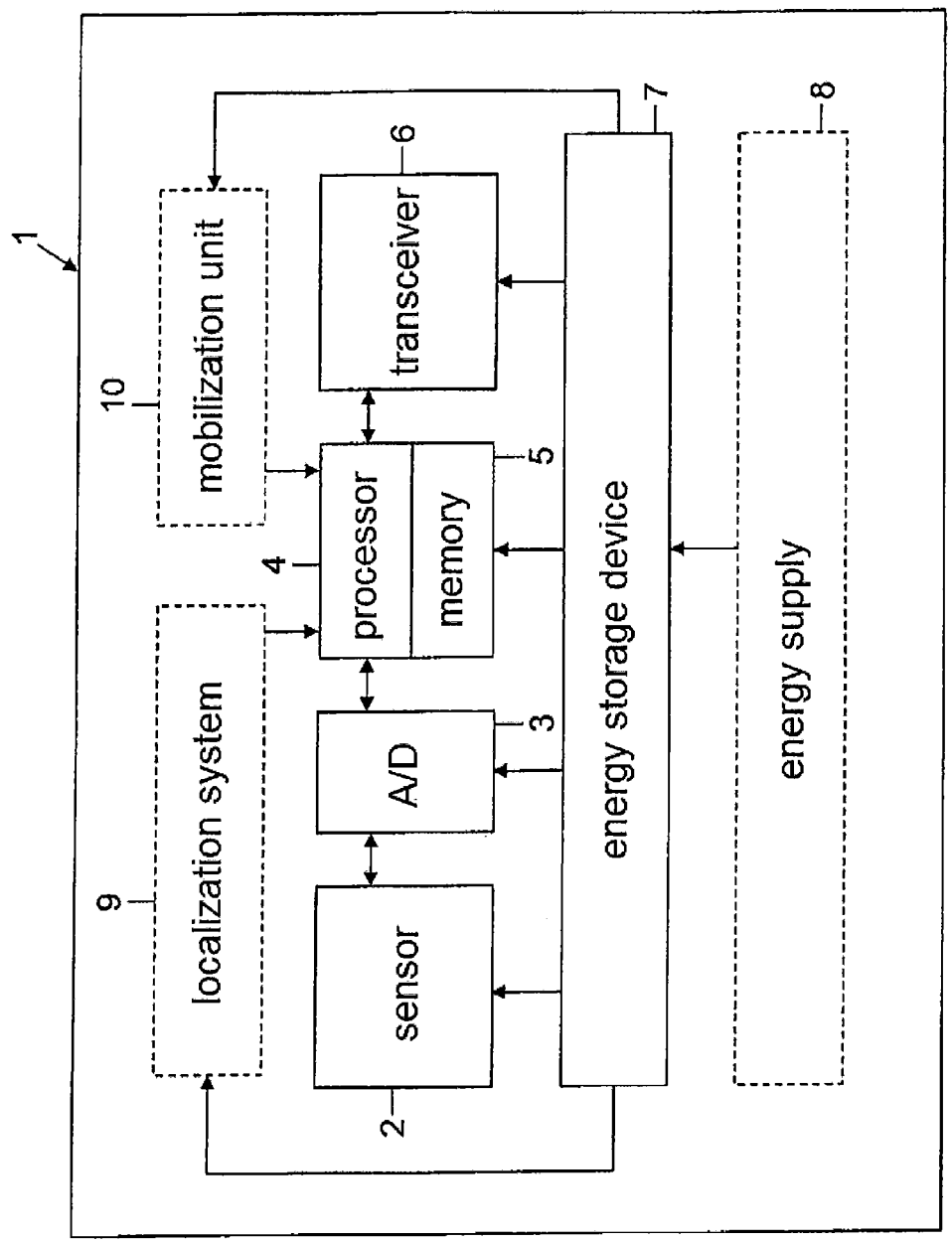
FIG. 1 shows a per se known construction of a sensor network node in a sensor network in which a communication device based on the invention can be integrated.

FIG. 1 shows in a schematic representation a per se known construction of a network node, 1 in the following referred to as sensor network node, for use in a wireless sensor network which comprises several further sensor network nodes 1. The sensor network node 1 comprises a sensor 2 with which certain quantities in the environment of the sensor 2 can be measured, such as e.g. the temperature. The data captured via the sensor 2 are processed in a suitable manner via an A/D converter 3 as well as a processor 4 with corresponding memory 5, so as to then be transmitted via a transceiver 6 (i.e. a transmitting and receiving unit) as wireless communication signals into the sensor network. These communication signals can then be received and processed by other sensor network nodes within the range of the sensor network node 1. Here, each sensor network node in the sensor network is able to establish communication connections to other sensor network nodes in its broadcast range and both to emit and to receive communication signals.

For the operation of the individual components 2 to 6 of the sensor network node 1, a local energy storage device 7 is provided, which can be configured as a battery or accumulator and supplies power to the components 2 to 6. The communication signals transmitted between the sensor network nodes 1 only serve for the communication transmission, and no power transmission is effected, as this is the case in RFID systems upon the communication between an RFID reading device and a passive transponder. Accordingly, the transmit power of the transceiver 6 is low and makes possible even a long-term operation of the sensor network node 1 with the local energy storage device 7. Typically, the transmit power for communication with other sensor network nodes 1 is lower by at least one power of ten and preferably by several powers of ten than the transmit power of a conventional RFID reading device in the same frequency range. As frequency ranges for emitting or receiving communication signals in the sensor network there are suitable e.g. 466/868/915 MHz or 2.4 GHz. Depending on the employed radio technology (Bluetooth, WiFi, ZigBee etc), indoor ranges for the individual sensor network nodes from 10 m to 200 m can be achieved thereby.

In the sensor network node 1 of the FIG. 1, besides the described components, there are also represented optional components which are indicated by dashed-line boxes. Among other things, there can be provided, where appropriate, also an energy supply 8 with which a sensor network node 1 is connected to an energy network, so that the sensor network node 1 is not only dependent on the local energy storage device 7. The energy supply 8 may in particular also have the form of a separate self-sufficient, preferably regenerative energy source, which is based e.g. on solar cells, thermal elements, piezoelectric crystals, dynamo arrangements, etc. There can also be provided, where appropriate, a localization system 9 and a mobilization unit 10. With the localization system 9 there can be localized the location of a sensor network node 1 which can be set up anywhere in the room. The mobilization unit 10 enables the realization of sensor network nodes 1 which can move independently in the room. The sensor network node 1 of the FIG. 1 or a sensor network based thereon can be used for various purposes, for example in the context of building surveillance or for the climate control in a building, whereby the data of the individual sensors of the sensor network node 1 are wirelessly exchanged between the sensor network nodes 1 and based thereon a corresponding control of suitable manipulated variables is effected.

The transceiver 6 employed in the sensor network node of FIG. 1 is a short-range radio device (SRD=short range device) which is equipped with an active radio transmitter and is independently able to radiate communication signals based on a high-frequency electromagnetic field.

Figure 2:
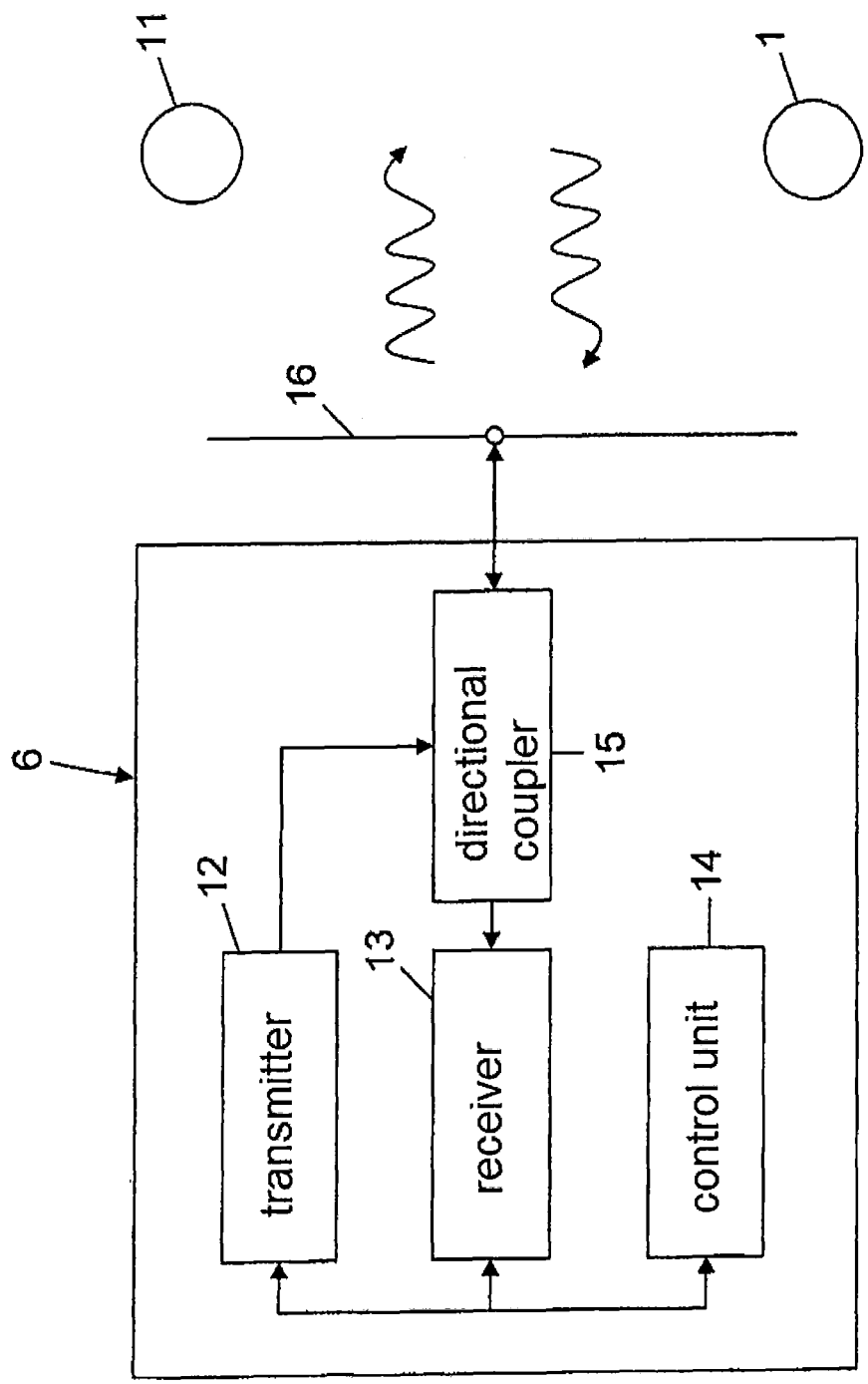
FIG. 2 shows a schematic representation of an embodiment of a communication device which is integrated in a sensor network node according to the invention.

According to the invention, there has been found that the communication signals emitted with low transmit power for communication with other sensor network nodes 1, which in the following are also referred to as first communication signals, can also be used as detection signals, in order to detect, as indicated in FIG. 2, the presence of a transponder 11 in the response range of the sensor network node 1. After having recognized a transponder 11, the sensor network node 1 then can emit second communication signals with a higher transmit power for the RFID communication with the detected transponder 11. In order to make this possible, a conventional transceiver 6 in a sensor network node 1 is extended in a suitable manner by a detection device which makes possible the detection of transponders 11 based on first communication signals.

FIG. 2 shows a schematic representation of a communication device, which is extended by the above-described detection device and is used according to the invention as a transceiver 6 in the sensor network node 1 of FIG. 1. The mode of function of the communication device 6 here corresponds to the communication device according to EP 1 820 139 B1, whereby now, however, no separate detection signals are generated for the detection of a transponder, but the above-described first communication signals are used for this purpose.

According to FIG. 2, the communication device 6 comprises a transmitter 12, which is operable in a first communication mode and in a second communication mode. In the first communication mode, the first communication signals for communication with other sensor network nodes are emitted with a first transmit power. The transmitter 12 here is coupled with a directional coupler 15, which emits the first communication signals based on a first signal path via an antenna 16. The directional coupler 15 also has a second signal path, via which communication signals received by the antenna 16 are fed into the directional coupler 15 and reach a receiver 13. This receiver 13 assumes, in the embodiment of FIG. 2, both the reception and the evaluation of first communication signals in the first communication mode and the reception and the evaluation of second communication signals in the second communication mode, whereby this second communication mode represents a near-field communication between a transponder and the communication device 6 which in this case is operated as an RFID reading device. A transponder communicating with the communication device 6 is indicated in FIG. 2 with reference number 11. Further, for illustrating the fact that the communication device 6 is part of a sensor network, a further sensor network node 1 in the range of the communication device 6 is indicated.

The communication device 6 further has a control unit 14, which is both coupled with the transmitter 12 and with the receiver 13. Via the control unit 14 there is controlled the emitting and receiving of communication signals by the transmitter 12 and the receiver 13. In particular, the control unit 14 switches, based on switching signals coming from the receiver 13, the transmitter 12 and the receiver 13 from the first to the second communication mode and vice versa. Upon operation in the first communication mode, the transmitter 12 emits via the directional coupler 15 first communication signals with low transmit power, which in particular relate to information which comprises sensor data ascertained by its sensor. Analogously, the receiver 13 receives first communication signals emitted by other sensor network nodes 1 and can read out in a suitable manner the information contained therein.

The receiver 13 is additionally extended by the functionality of a detection device, which is constructed analogously to the detection device described in print EP 1 820 139 B1. The receiver 13 here also analyses received first communication signals as to whether they are communication signals previously emitted by the transmitter 12, which were reflected from a transponder 11. So as to support the recognition of a reflection, the first communication signals generated by the transmitter 12 are expediently modulated for this purpose with a suitable modulation method. Preferably, a frequency and/or phase modulation is used, which is constant in its amplitude and thus makes possible the detection of a transponder 11 via the evaluation of the signal strength of the reflected signal.

As long as there is no transponder in the vicinity of the antenna 16, the receiver 13 records a substantially constant, reflected first communication signal, which is generated through the reflection of the electromagnetic waves emitted by the antenna 16 against objects in the environment of the antenna. Upon an approach of the transponder 11 towards the antenna 16, the signal strength of the reflected first communication signal increases. This increase is particularly significant, when by the transmitter 12 there are generated first communication signals with a frequency within the response frequency range of the transponder 11, within which there is usually also conducted the communication with the transponder 11. In this response frequency range, which for example lies between 860 MHz to 930 MHz, the transponder 11 has a particularly high backscatter cross-section. Therefore, the receiver 13 detects the presence of the transponder 11 in the range of the communication device 6, when the recorded signal strength of the reflected first communication signals exceeds a specified value or suddenly changes.

The receiver 13 thus both makes possible an evaluation of such first communication signals which come from other sensor network nodes 1 and an evaluation of such first communication signals which were emitted via the transmitter 12 and reflected from a transponder 11, in order to detect, based on the evaluation, the presence of a transponder 11 in the environment of the sensor network node. A data exchange with a transponder 11 is not yet effected at the time of the detection, and is not even possible in the first communication mode due to the transmit power which is insufficient therefor.

If the presence of a transponder 11 was detected, the receiver 13 gives a switching signal to the control unit 14, which then switches the transmitter 12 and the receiver 13 to the second communication mode, which makes possible, within an RFID communication, a data exchange between communication device 6 and transponder 11. In the second communication mode, the transmit power of the transmitter 12 is increased to a value necessary for an RFID communication. With the increased transmit power then second communication signals are emitted, with which not only information can be exchanged between communication device 6 and transponder 11, but the transponder 11 is also supplied with energy. For the data transmission from transponder 11 to communication device 6, here, the backscatter cross-section of the (not shown) transponder antenna is modulated depending on the data to be transmitted.

Increasing the transmit power of the transmitter 12 is effected here only for a limited time after the detection of a transponder 11. If either the communication with the transponder 11 is completed or the transponder 11 leaves the response range of the communication device 6, the transmit power is reduced back to the amount for a communication in the first communication mode.

According to the embodiment of FIG. 2, by one individual receiver 13 both the detection of the presence of a transponder 11 and the evaluation of the first and/or communication second signals for the extraction of the information contained therein are carried out. However, it is also possible that these functionalities, where appropriate, are distributed to more than one receiver. In particular, one receiver 13 can be configured only for the detection of the presence of a transponder 11, one or several further receivers can be employed for the evaluation of the communication signals coming from a different sensor network node or a transponder. Moreover, there is also the possibility that separate transmitters are used for emitting the first communication signals and the second communication signals. In particular, there is also the possibility, where appropriate, that the frequencies of the first communication signals differ from those of the second communication signals.

The embodiment of a communication device according to the invention for use in a sensor network node 1, described hereinabove, has a number of advantages. In particular, a reliable detection of the presence of a transponder 11 located in the transmission range of a sensor network node 1 is made possible, without there being effected an exchange of data contents with the transponder 11 for the recognition process, so that a corresponding power transmission is not required. Upon the detection of the presence of a transponder 11, an improvement of the energy balance of the corresponding sensor network node 1 is achieved by the sent-out first communication signals simultaneously serving as detection signals through suitable modulation, without additional energy effort, whereby the detection signals reflected from the transponder 11 are received and evaluated for the detection of the transponder 11. Here, a peculiarity of the sensor network node 1 is that the transmit power of the transmitter 12 of the sensor network node 1 for a communication with other sensor network nodes is lower than the transmit power used for the RFID communication with a transponder.

The invention claimed is:

1. A sensor network node for a wireless communication network, the sensor network node comprising:
   a wireless communication device; and
   a sensor configured to measure a predetermined quantity in an environment of the sensor, wherein
   the communication device is configured such that it is operable in a first communication mode, in which the communication device emits first communication signals at a first transmit power for contactless communication with another sensor network node of the communication network, the another sensor network node having another sensor configured to measure a predetermined quantity in an environment of the another sensor;
   the communication device comprises a receiving device that receives first communication signals reflected on a transponder, said receiving device being arranged to evaluate the reflected first communication signals to thereby detect the presence of the transponder in a defined area around the network node;
   said communication device is further configured such that it is operable in a second communication mode, in which the communication device emits, with a second transmit power, second communication signals for communication with the transponder, wherein the second transmit power is greater than the first transmit power; and
   the communication device is configured such that a change is effected from the first to the second transmit power when the presence of the transponder has been detected.

2. The network node according to claim 1, wherein at least one of the receiving device and at least one further receiving device is arranged to evaluate in the first communication mode the first communication signals emitted by other network nodes, to thereby extract the information contained in the first communication signals, and the receiving device is further arranged to evaluate the second communication signals reflected from a transponder in the second communication mode, to thereby extract the information transmitted by the transponder in the second communication signals.

3. The network node according to claim 1, wherein the communication device is configured such that it modulates the first communication signals emitted thereby by a modulation method.

4. The network node according to claim 1, wherein the communication device is configured such that after a change from the first to the second transmit power due to the detection of the presence of a transponder, there is again effected a change to the first transmit power when at least one of the following occurs: a predetermined time period has expired; a communication with the transponder in the second communication mode is completed; the transponder is no longer in the range of the communication device.

5. The network node according to claim 1, wherein the first transmit power is lower by at least one power of ten than the second transmit power, so that the first transmit power is between 0.001 and 0.1 watt and the second transmit power is 1 watt or more.

6. The network node according to claim 1, wherein the communication device is configured such that in the first communication mode the first communication signals are emitted without an energy transmission coupled therewith, and in the second communication mode the transponder is supplied with energy via the second communication signals.

7. A wireless communication network comprising a plurality of network nodes which can wirelessly communicate with each other, wherein the plurality of network nodes includes at least a first sensor network node and a second sensor network node, the first sensor network node including a first sensor configured to measure a predetermined quantity in an environment of the first sensor and the second sensor network node including a second sensor configured to measure a predetermined quantity in an environment of the second sensor, the first sensor network node includes a wireless communication device configured such that it is operable in a first communication mode, in which the communication device is configured to emit first communication signals at a first transmit power for contactless communication with the second sensor network node;

the communication device comprises a receiving device that receives reflected first communication signals reflected on a transponder, said receiving device being arranged to evaluate the reflected first communication signals and thereby detect the presence of the transponder in a defined area around the first sensor network node;

said communication device is further configured such that it is operable in a second communication mode, in which the communication device is configured to emit second communication signals at a second transmit power for communication with the transponder, wherein the second transmit power is greater than the first transmit power; and the communication device is configured such that a change is effected from the first to the second transmit power when the presence of the transponder has been detected.

8. A method for detecting, with a network node, a presence of a transponder in an environment of the network node in a wireless communication network, the method comprising:

emitting, via a communication device of the network node in a first communication mode, first communication signals for contactless communication with another network node of the communication network, wherein the first communication signals are emitted by the communication device with a first transmit power, the network node including a sensor configured to measure a predetermined quantity in an environment of the sensor and the another network node including another sensor configured to measure a predetermined quantity in an environment of the another sensor; and receiving, by a receiving device of the communication device, first communication signals reflected on a transponder;

evaluating the reflected first communication signals to thereby detect the presence of the transponder in a defined area around the network node;

emitting, via the communication device of the network node in a second communication mode, second communication signals for communication with the transponder, wherein the second communication signals are emitted by the communication device with a second transmit power, the second transmit power being greater than the first transmit power; and changing the communication device from the first transmit power to the second transmit power in a case that the presence of the transponder has been detected.

* * * * *